(12) United States Patent
Zhao et al.

(10) Patent No.: US 12,446,828 B2
(45) Date of Patent: Oct. 21, 2025

(54) WEARABLE MULTI-INDEX INTEGRATED PHYSIOLOGICAL INTELLIGENT SENSOR SYSTEM AND PHYSIOLOGICAL INDEX MONITORING METHOD

(71) Applicant: KINGFAR INTERNATIONAL INC., Beijing (CN)

(72) Inventors: Qichao Zhao, Beijing (CN); Ran Yang, Beijing (CN); Zhao Li, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 406 days.

(21) Appl. No.: 18/086,768

(22) Filed: Dec. 22, 2022

(65) Prior Publication Data

US 2023/0210462 A1    Jul. 6, 2023

Related U.S. Application Data

(63) Continuation of application No. PCT/CN2022/095702, filed on May 27, 2022.

(30) Foreign Application Priority Data

Dec. 31, 2021 (CN) .......................... 202111673253.1

(51) Int. Cl.
*A61B 5/00* (2006.01)
*A61B 5/024* (2006.01)
*A61B 5/145* (2006.01)

(52) U.S. Cl.
CPC ............ *A61B 5/6815* (2013.01); *A61B 5/024* (2013.01); *A61B 5/02416* (2013.01);
(Continued)

(58) Field of Classification Search
CPC ... A61B 5/6815; A61B 5/024; A61B 5/02416; A61B 5/02438; A61B 5/14542;
(Continued)

(56) References Cited

U.S. PATENT DOCUMENTS 9,579,060 B1 * 2/2017 Lisy ...................... A61B 5/165
2008/0165017 A1  7/2008 Schwartz
(Continued)

FOREIGN PATENT DOCUMENTS

CN      109044296 A    12/2018
CN      109222951 A    1/2019
(Continued)

*Primary Examiner* — Catherine M Voorhees
(74) *Attorney, Agent, or Firm* — Cooper Legal Group, LLC

(57) ABSTRACT

Disclosed are a wearable multi-index integrated physiological intelligent sensor system and a physiological index monitoring method. The system includes a device body and an intelligent terminal. The device body is provided with a fixing piece, which is configured to fix the device body at a human ear; the device body is further provided with a collecting and processing assembly, which is in wireless communication connection with the intelligent terminal; the collecting and processing assembly collects a corresponding physiological index signal in response to a physiological index collection instruction sent by the intelligent terminal, and analyzes and processes the physiological index signal to obtain a corresponding physiological index data, and sends the physiological index data to the intelligent terminal; in which, the physiological index signal includes electrodermal signal, heart rate signal and blood oxygen signal; the intelligent terminal is configured to receive and display a physiological index data.

11 Claims, 2 Drawing Sheets

(52) U.S. Cl.
CPC ...... *A61B 5/02438* (2013.01); *A61B 5/14542* (2013.01); *A61B 5/6816* (2013.01); *A61B 5/6838* (2013.01); *A61B 5/721* (2013.01); *A61B 2560/0276* (2013.01)

(58) Field of Classification Search
CPC ..... A61B 5/6816; A61B 5/6838; A61B 5/721; A61B 2560/0276; A61B 5/0205
See application file for complete search history.

(56) References Cited

U.S. PATENT DOCUMENTS

| | | | |
|---|---|---|---|
| 2015/0157270 A1* | 6/2015 | Kyal | A61B 5/1128 600/479 |
| 2019/0053766 A1* | 2/2019 | Mijovic | A61B 5/378 |
| 2019/0223747 A1* | 7/2019 | Chou | A61B 5/291 |
| 2020/0390402 A1* | 12/2020 | Fernando | H04W 4/38 |
| 2022/0039707 A1* | 2/2022 | Sharma | A61B 5/024 |
| 2022/0157143 A1* | 5/2022 | Panneer Selvam | G04G 9/007 |

FOREIGN PATENT DOCUMENTS

| | | | |
|---|---|---|---|
| CN | 111166305 A | | 5/2020 |
| CN | 111166307 A | | 5/2020 |
| CN | 112137609 A | | 12/2020 |
| CN | 214104390 U | | 9/2021 |
| CN | 114403835 A | | 4/2022 |
| CN | 216257099 U | | 4/2022 |
| JP | 2004237066 | * | 8/2004 |
| JP | 2004237066 A | | 8/2004 |

* cited by examiner

WEARABLE MULTI-INDEX INTEGRATED PHYSIOLOGICAL INTELLIGENT SENSOR SYSTEM AND PHYSIOLOGICAL INDEX MONITORING METHOD

CROSS-REFERENCE TO RELATED APPLICATION

The present application is a continuation of PCT application No. PCT/CN2022/095702, filed on May 27, 2022, which claims the priority benefit of China patent application No. 202111673253.1, filed on Dec. 31, 2021. The entireties of PCT application No. PCT/CN2022/095702 and China patent application No. 202111673253.1 are hereby incorporated by reference herein and made a part of this specification.

TECHNICAL FIELD

The present application relates to fields of physiological signal detection technology and artificial intelligence key technology, in particularly, to a wearable multi-index integrated physiological intelligent sensor system and a physiological index monitoring method.

BACKGROUND ART

With a continuous development of artificial intelligence and information technology, a large number of monitoring and sensing devices are used to individual state perception and analysis, which is convenient for people to work efficiently, conveniently and safely in a system, so as to improve a work efficiency. For example, in a field of intelligent driving, a variety of sensors are used to identify a fatigue condition of a driver, so as to reduce an occurrence of traffic accident resulted by fatigue; in a field of military industry and national defense, by identifying a condition perception and cognition load condition of warfighters, a battlefield command and combat effectiveness can be improved; in particularly, in a construction of military industry and national defense, for massive, multi-source, complex, heterogeneous and rapidly growing battlefield situation data, cognitive speed and information processing ability of human are difficult to keep up with the rhythm of growth and change of battlefield data. It has become a key problem in cognitive research that how to deal with the rapidly changing battlefield situation and adopt a convenient method to realize relatively intelligentized cognition of the battlefield situation, so as to assist a commander to make decisions in real time, efficiently and scientifically. Acquiring human physiological condition information in real time and providing support for people purposefully is one of key links to solve this problem.

At present, most of detection devices developed and researched according to a physiological sensor technology are not portable, and signals collected by the measuring device are relatively single, which cannot be worn in daily life and special working environment to collect and monitor multi-sources physiological data, so that these data cannot be used to describe the physiological state of human body and other task state mapped by the physiological state in more detail and accurately. Then, although there are also some sensor technologies that attempt to adopt a multi-index method, such as a wrist sensor on the market, there are obviously insufficiencies in its accuracy, real-time multi-index intelligent integration effect and wearable effect.

Considering of the above related technology, the inventor develops a multi-source sensors that is portable, stable, reliable and can collect human multi-source physiological signal, and researches an intelligent sensor system that can integrate related data. By adopting multi-channel data collection method, a variety of collection modules of the physiological signals are integrated into a small and portable intelligent wearable sensor device, so as to complete research and development of a multi-sources intelligent sensor, and realize a stable collection of data of human body condition in specific task environment.

SUMMARY

In order to develop a wearable portable multi-sources data physiological intelligent sensor, and realize an analysis and process to the multi-sources physiological signal collected by a hardware and improve an accuracy, and intelligent process degree of a multi-sources data collection of the intelligent sensor, the present application provides a wearable multi-index integrated physiological intelligent sensor system and a physiological index monitoring method.

In first aspect, the present application provides the wearable multi-index integrated physiological intelligent sensor system, adopting the following technical solutions.

A wearable multi-index integrated physiological intelligent sensor system, including a device body and an intelligent terminal; the device body is provided with a fixing piece, which is configured to fix the device body at a human ear; the device body is further provided with a collecting and processing assembly, which is in wireless communication connection with the intelligent terminal.

The collecting and processing assembly collects a corresponding physiological index signal in response to a physiological index collection instruction sent by the intelligent terminal, and analyzes and processes the physiological index signal to obtain a corresponding physiological index data, and sends the physiological index data to the intelligent terminal; in which, the physiological index signal includes electrodermal signal, heart rate signal and blood oxygen signal.

The intelligent terminal is configured to receive and display the physiological index data.

In the above embodiments, when monitoring a physiological index, the device body is fixed at the user's ear by using the fixing piece, and the user can send the physiological index collection instruction with the intelligent terminal. The collecting and processing assembly at the device body collects the corresponding physiological index signal in response to the physiological index collection instruction, and analyses and processes the corresponding physiological index signal to obtain the physiological index data, and sends the physiological index data to the intelligent terminal. The user can view their own physiological index data with the intelligent terminal. Compared with a common physiological index monitoring device, the device provided in the present application is smaller and portable, and integrates multiple physiological indices. By wearing the device at the human ear, the physiological indices of a human can be monitored, so that the user can obtain information about their own multiple physiological indices in real time, so as to realize real-time monitoring of physiological health condition and improve a user experience.

In some embodiments, the collecting and processing assembly also is configured to, upon the collecting of the corresponding physiological index signal, determine whether the blood oxygen signal or heart rate signal has been successfully obtained; when the blood oxygen signal or the heart rate signal has been successfully obtained, output a wearing state normal signal is output; when the blood oxygen signal or the heart rate signal has failed to be obtained, stop collecting of the corresponding physiological index signal and output a wearing state abnormal signal.

In the above embodiments, during monitoring, if the collecting and processing assembly can obtain the blood oxygen signal or heart rate signal normally, it can be determined that a wearing state is normal; if the blood oxygen signal or heart rate signal cannot be obtained, it may be that the device body is not fixed well or has been removed, so that it can be determined that the wearing state is abnormal and the collection should be stopped, so as to know the wearing state of the device body in real time and stop monitoring after removed from the ear.

In some embodiments, the fixing piece includes an earlobe clip, which is fixedly connected to the device body and configured for clamping with an earlobe part of the human ear.

In the above embodiments, the device body is clamped at the earlobe part of the human ear by using the earlobe clip, which reduce an occurrence of a situation that the device body slips off when wearing by the user, and improve a stability when monitoring the physiological indices.

In some embodiments, the collecting and processing assembly includes an electrodermal signal collection unit, an infrared light emitter, a red light emitter, a photoelectric sensor and a processing module.

The electrodermal signal collection unit is configured to collect an electrodermal signal of a shoulder and a back of the human body, and the red light emitter and the infrared light emitter are provided at an inner side of a clip body at one side of the earlobe clip, and the photoelectric sensor is provided at the inner side of the clip body at another side of the earlobe clip. The collection of the heart rate signal and/or the blood oxygen signal is performed by the photoelectric sensor by receiving a light beam emitted by the infrared light emitter and the red light emitter and transmitted through the earlobe.

The processing module is configured to analyze and process the physiological index signal to obtain the corresponding physiological index data.

In the above embodiments, the electrodermal signal of the shoulder and the back of the human is collected by using the electrodermal signal collection unit, and the clip bodies at both sides of the earlobe clip completely covers the earlobe of the human ear. The heart rate signal is collected by turning on the red light emitter separately to emit a red light, and the blood oxygen signal is collected by turning on the red light emitter and the infrared light emitter at the same time, so as to obtain the multiple physiological index data of the human.

In some embodiments, the collecting and processing assembly further includes an acceleration sensor, which is configured to collect an acceleration value generated during motion of the human and send the acceleration value to the processing module; the processing module also is configured to determine whether the acceleration value is higher than a preset threshold, and mark a time period when the acceleration value is higher than the preset threshold as a motion period.

In the above embodiments, the acceleration value generated by the human during motion is collected by using the acceleration sensor. When the acceleration value is higher than the preset threshold, this period is marked as the motion period by using the processing module, so as to know the corresponding physiological index data when the human is in the motion period.

In some embodiments, the device further includes a green light emitter, which is provided at the inner side of the clip body at one side of the earlobe clip. The green light emitter is connected with the processing module and configured to be turned on when the acceleration value is higher than the preset threshold.

In the above embodiments, when the human is in motion, the collection of the blood oxygen signal and/or the heart rate signal can be disturbed by an ambient light. Thus, when the acceleration value collected by the acceleration sensor reaches the preset threshold, the green light emitter is turned on to emit a green light to inhibit the ambient light around the earlobe clip, so that the accuracy when collecting the blood oxygen signal and/or the heart rate signal is improved; when the acceleration value is not higher than the preset threshold, the green light emitter will not be turned on.

In second aspect, the present application provides a physiological index monitoring method, adopting the following technical solutions.

The physiological index monitoring method is applied to the wearable multi-index integrated physiological intelligent sensor system in the first aspect. The physiological index monitoring method includes, receiving the physiological index collection instruction sent by the intelligent terminal, and collecting the corresponding physiological index signal in response to the physiological index collection instruction; in which, the physiological index signal includes electrodermal signal, heart rate signal and blood oxygen signal;

analyzing and processing the physiological index signal to obtain the corresponding physiological index data, and sending the physiological index data to the intelligent terminal for display.

In the above embodiment, when monitoring the physiological indices, the user send the physiological index collection instruction by using the intelligent terminal, and the collecting and processing assembly at the device body collects the corresponding physiological index signal in response to the physiological index collection instruction, and analyses and processes the physiological index signal to obtain the physiological index data, and sends the physiological index data to the intelligent terminal. The user can view their own physiological index data by the intelligent terminal. Compared with the common physiological index monitoring device, the device provided in the present application is small, portable and integrates multiple physiological indices. The physiological indices of the human can be monitored by wearing the device at the human ear, which is convenient for the user to obtain information of their own multiple physiological indices in real time, so as to realize a real-time monitoring of a physical health and improve the user experience.

In some embodiments, the physiological index monitoring method further includes, determining whether the blood oxygen signal or heart rate signal is obtained; if yes, outputting the wearing state normal signal; if no, stopping collecting the physiological index signal and outputting the wearing state abnormal signal.

In the above embodiments, during monitoring, if the blood oxygen signal or the heart rate signal can be obtained normally, it can be determined that the wearing state is normal; if the blood oxygen signal or the heart rate signal cannot be obtained, it indicates that the blood oxygen signal or the heart rate signal cannot be collected, thus it can be determined that the earlobe clip is not clamped well or has been removed, that is, the wearing state is abnormal. Thus, it is convenient to know the wearing state of the device body in real time.

In some embodiments, the physiological index monitoring method further includes, collecting the acceleration value generated by the human during the motion, and determining whether the acceleration value is higher than the preset threshold; if yes, turning on the green light emitter, and marking the time period when the acceleration value is higher than the preset threshold as the motion period; if no, turning off the green light emitter.

In the above embodiments, when the human is in motion, the collection of the blood oxygen signal and/or the heart rate signal can be disturbed by the ambient light. Thus, when the acceleration value collected by the acceleration sensor reaches the preset threshold, the green light emitter is turned on to emit a green light to inhibit the ambient light around the earlobe clip, so that the accuracy when collecting the blood oxygen signal and/or the heart rate signal is improved; when the acceleration value is not higher than the preset threshold, the green light emitter will not be turned on.

In third aspect, the present application provides a computer readable storage medium, adopting the following technical solutions.

The computer readable storage medium stores a computer program, which can be loaded by the processor and execute the methods described in the second aspect.

DETAILED DESCRIPTION

In order to make purposes, technical solutions and advantages of the present application more clear, the present application is further illustrated in detail below in combination with FIGS. 1-2 and embodiments. It should be understood that the specific embodiments described herein are only used to illustrate the present application, but not to limit the present application.

The embodiments of the present application disclose a wearable multi-index integrated physiological intelligent sensor system.

Figure 1:
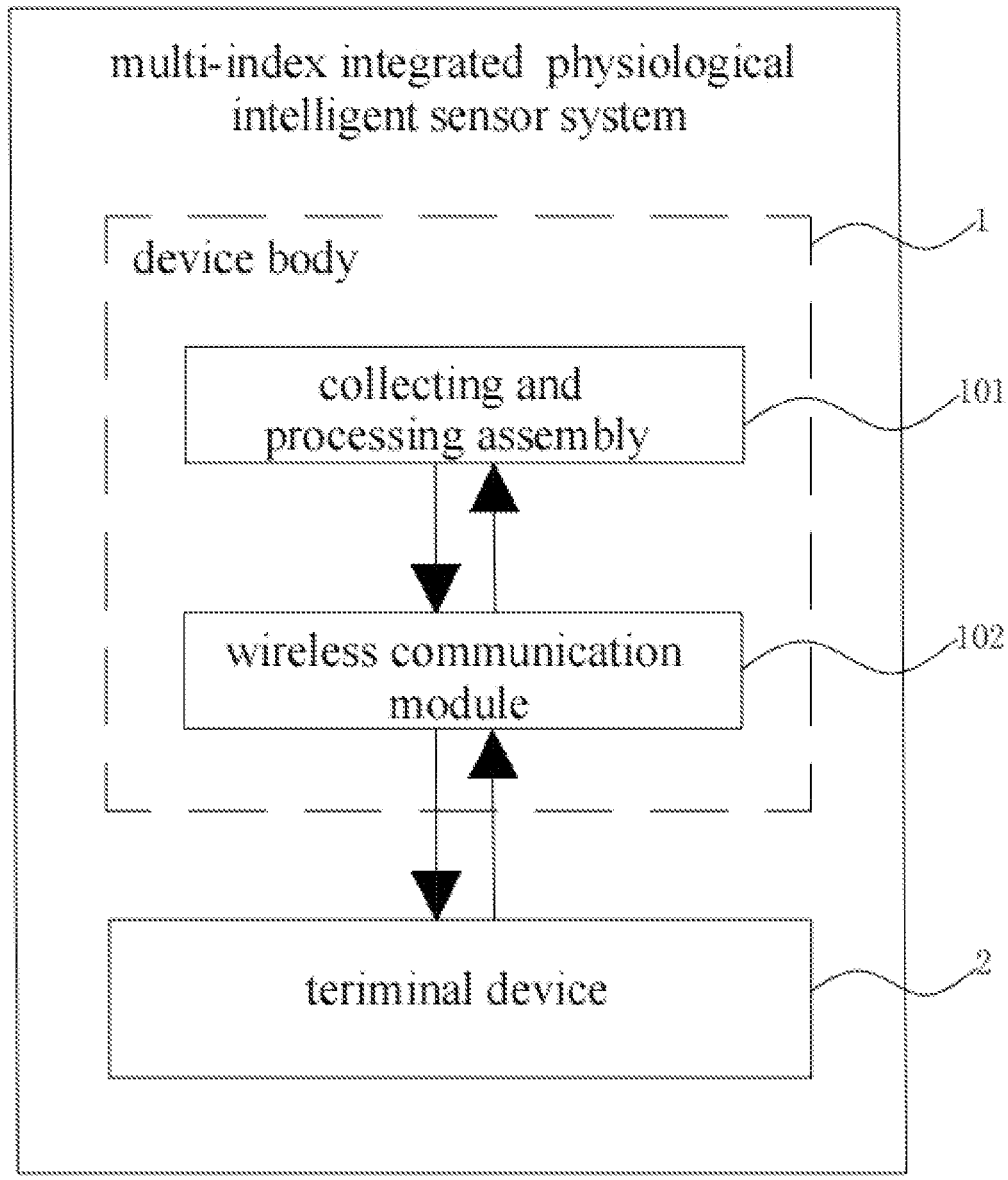
FIG. 1 is a structural block diagram of a wearable multi-index integrated physiological intelligent sensor system in one of embodiments of the present application
Figure 2:
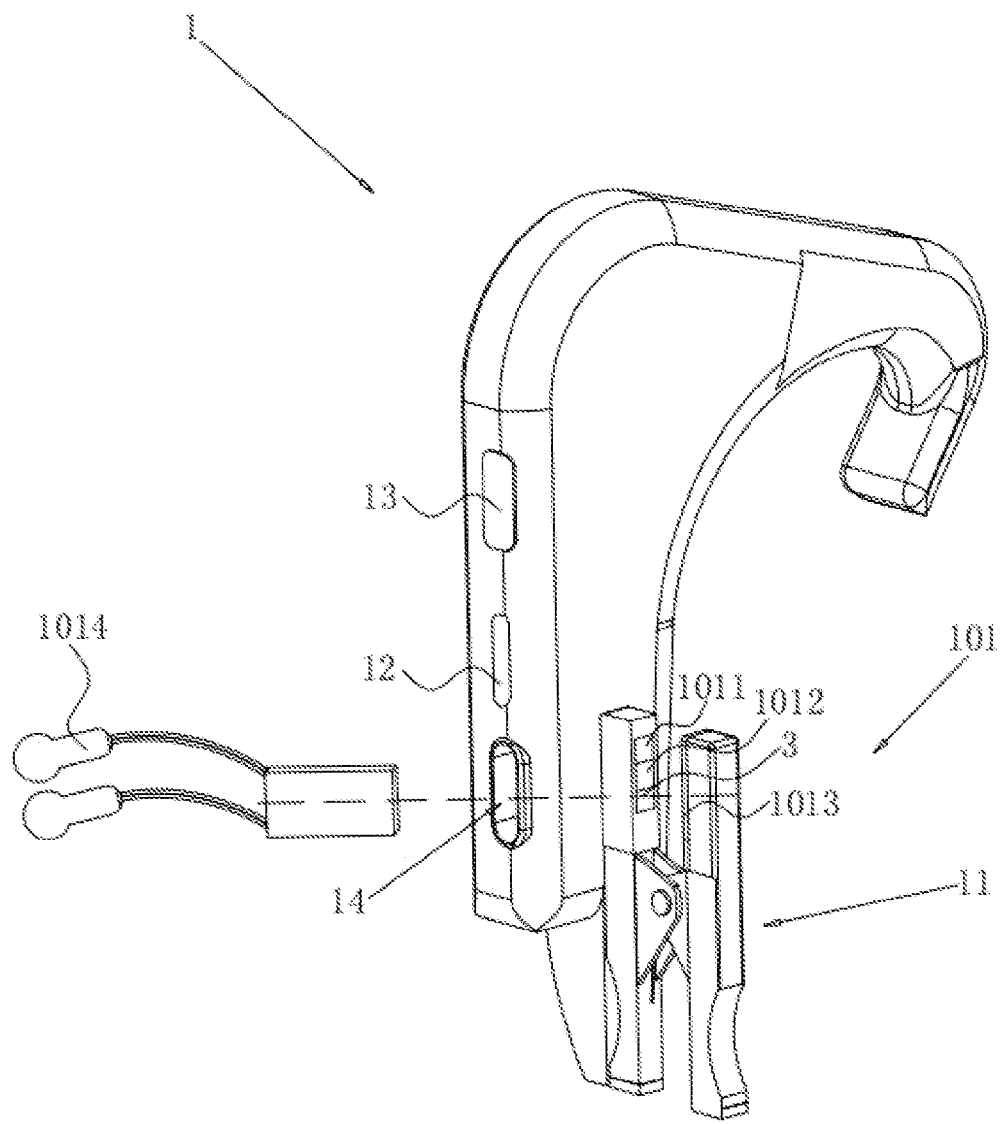
FIG. 2 is a structural diagram of a device body in one of embodiments of the present application.

Referring to FIG. 1 and FIG. 2, the wearable multi-index integrated physiological intelligent sensor system includes a device body 1 and an intelligent terminal 2. The device body 1 is provided with a fixing piece, which is configured to fix the device body 1 at a human ear; the device body 1 is further provided with a collecting and processing assembly 101, which is in wireless communication connection with the intelligent terminal 2.

The collecting and processing assembly 101 collects a corresponding physiological index signal in response to a physiological index collection instruction sent by the intelligent terminal 2, and analyzes and processes the physiological index signal to obtain a corresponding physiological index data, and sends the physiological index data to the intelligent terminal 2; in which, the physiological index signal includes electrodermal signal, heart rate signal and blood oxygen signal.

The intelligent terminal 2 is configured to receive and display a physiological index data. In which, the intelligent terminal 2 can be a mobile intelligent terminal, such as a mobile phone, a tablet PC and so on, and also can be a computer terminal.

In the above embodiments, when monitoring a physiological index, the device body 1 is fixed at the user's ear by using the fixing piece, and the user can send the physiological index collection instruction with the intelligent terminal 2. The collecting and processing assembly 101 at the device body 1 collects the corresponding physiological index signal in response to the physiological index collection instruction, and analyses and processes the corresponding physiological index signal to obtain the physiological index data, and sends the physiological index data to the intelligent terminal 2. The user can view their own physiological index data with the intelligent terminal 2. Compared with a common physiological index detection device, the device provided in the present application is smaller and convenient to carry, and integrates multiple physiological indices. By wearing the device at the human ear, the physiological indices of a human can be monitored, so that the user can obtain information about their own multiple physiological indices in real time, so as to realize real-time monitoring of physiological health condition and improve a user experience.

In order to reduce an occurrence of a situation that the physiological index signal cannot be collected or is collected inaccurately caused by an earlobe clip 11 slips, as a further embodiment of the collecting and processing assembly 101, the collecting and processing assembly 101 also is configured to, upon the collecting of the corresponding physiological index signal, determine whether the blood oxygen signal or heart rate signal has been successfully is obtained. If the blood oxygen signal or the heart rate signal has been successfully obtained, a wearing state normal signal is output; if the blood oxygen signal or the heart rate signal has failed to be obtained, a collection is stopped and a wearing state abnormal signal is output.

In the above embodiments, during monitoring, if the collecting and processing assembly 101 can obtain the blood oxygen signal or heart rate signal normally, it can be determined that a wearing state is normal; if the blood oxygen signal or heart rate signal cannot be obtained, it may be that the device body 1 is not fixed well or is removed, so that it can be determined that the wearing state is abnormal, and the collection should be stopped, so as to know the wearing state of the device body 1 in real time and stop monitoring after removed from the ear.

Referring to FIG. 1, as one of the embodiments that the collecting and processing assembly 101 is in wireless communication connection with the intelligent terminal 2, the device body 1 is further provided with a wireless communication module 102. The collecting and processing assembly 101 is in wireless communication connection with the intelligent terminal 2 by the wireless communication module 102. In this embodiment, the wireless communication module 102 is a bluetooth module; in addition, it also can be a mobile data transmission module, a WIFI module, a ZigBee module and so on. That is, the wireless communication module 102 can be any modules which can realize the wireless communication connection.

Referring to FIG. 2, as one of the embodiments of the fixing piece, the fixing piece includes the earlobe clip 11, which is fixedly connected to the device body 1 and configured for clamping with an earlobe part of the human ear.

In the above embodiments, the device body 1 is clamped at the earlobe part of the human ear by using the earlobe clip 11, which reduce an occurrence of a situation that the device body 1 slips off when wearing by the user, and improve a stability when monitoring the physiological indices.

Referring to FIG. 2, as one of the embodiments of the collecting and processing assembly 101, the collecting and processing assembly 101 includes an electrodermal signal collection unit, an infrared light emitter 1012, a red light emitter 1011, a photoelectric sensor 1013 and a processing module.

The electrodermal signal collection unit is configured to collect an electrodermal signal of a shoulder and a back of the human body, and the red light emitter 1011 and the infrared light emitter 1012 are provided at an inner side of a clip body at one side of the earlobe clip 11, and the photoelectric sensor 1013 is provided at the inner side of the clip body at another side of the earlobe clip 11. The collection of the heart rate signal and/or the blood oxygen signal is performed by the photoelectric sensor 1013 by receiving a light beam emitted by the infrared light emitter 1012 and the red light emitter 1011 and transmitted through the earlobe. In which, the electrodermal signal collection unit includes two electrodermal signal collection buckles 1014 for collecting the electrodermal signal of the shoulder and the back, which can be connected with the device body 1 by using the electrodermal signal detection line.

The processing module is configured to analyze and process the physiological index signal to obtain the corresponding physiological index data. In which, the processing module can be CPU processor, single chip and so on.

In the above embodiment, the electrodermal signal of the shoulder and the back of the human is collected by using the electrodermal signal collection unit, and the clip bodies at both sides of the earlobe clip 11 completely covers the earlobe of the human ear. The heart rate signal is collected by turning on the red light emitter 1011 separately to emit a red light, and the blood oxygen signal is collected by turning on the red light emitter 1011 and the infrared light emitter 1012 at the same time, so as to obtain the multiple physiological index data of the human.

Specifically, when collecting the heart rate data, the red light emitter 1011 is turned on, and the red light transmits through a skin and a degree of light loss is transferred to the photoelectric sensor 1013. Because there are abundant capillaries in the earlobe, with a flow of blood in an artery, an absorption ability to the red light also changes. At this time, the photoelectric sensor 1013 converts changes of received different light intensities into current signals, and the obtained current signals can be divided in to DC signal and AC signal. The AC signal is extracted, which can reflect a characteristic of a blood flow, thus a heart rate signal data can be obtained.

When collecting the blood oxygen signal, the infrared light and the red light can be emitted at the same time. Because there is a certain ratio of oxyhemoglobin $HbO_2$ to hemoglobin Hb in the blood, it is needed to emit the red light and the infrared light alternately at a certain frequency. The oxyhemoglobin $HbO_2$ has the stronger absorption ability to the red light, while the hemoglobin Hb has the stronger absorption ability to the infrared light. By calculating the ratio of an absorption amount of the oxyhemoglobin $HbO_2$ to the red light to an absorption amount of the hemoglobin Hb to the infrared light, a blood oxygen signal data can be obtained.

As the further embodiment of the collecting and processing assembly 101, the collecting and processing assembly 101 further includes an acceleration sensor, which is configured to collect an acceleration value generated during motion of the human and send the acceleration value to the processing module. The processing module also is configured to determine whether the acceleration value is higher than a preset threshold, and mark a time period when the acceleration value is higher than the preset threshold as a motion period.

In which, the acceleration sensor can be a three axis acceleration sensor or other types of acceleration sensor. By providing the acceleration sensor at the device body 1, the acceleration value of the user can be effectively collected.

In the above embodiments, the acceleration value generated by the human during motion is collected by using the acceleration sensor. When the acceleration value is higher than the preset threshold, this period is marked as the motion period by using the processing module, so as to know the corresponding physiological index data when the human is in the motion period.

Referring to FIG. 2, as the further embodiment of the device body 1, the device body 1 is further provided with a green light emitter 3, which is provided at the inner side of the clip body at one side of the earlobe clip 11. The green light emitter 3 is connected with the processing module and configured to be turned on when the acceleration value is higher than the preset threshold. In which, the preset threshold can be preset according to a historical experience.

It should be noticed that, the green light emitter 3 can be provided at the clip body at a side of the earlobe clip 11 close to the red light emitter 1011, and also can be provided at the clip body at a side of the earlobe clip 11 close to the photoelectric sensor 1013. In this embodiment, the green light emitter 3 is provided at the same side as the red light emitter 1011.

In the above embodiments, when the human is in motion, the collection of the blood oxygen signal and/or the heart rate signal can be disturbed by an ambient light. Thus, when the acceleration value collected by the acceleration sensor reaches the preset threshold, the green light emitter 3 is turned on to emit a green light to inhibit the ambient light around the earlobe clip 11, so that an accuracy when collecting the blood oxygen signal and/or the heart rate signal is improved; when the acceleration value is not higher than the preset threshold, the green light emitter 3 will not be turned on.

Referring to FIG. 2, as the further embodiment of the device body 1, the device body 1 is further provided with:
- a state index 12, configured for reminding an on/off state of the device body 1 and the wearing state of the user; in which, when it is detected that the wearing state is normal, the state index 12 flashes green light to remind; when it is detected that the wearing state is abnormal, the state index 12 flashes red light to remind;
- a switch button 13, configured for controlling a switching on and off of the device body 1;
- a charging and detection interface 14, configured for connecting with a charging line to charge the device body 1, and for connecting with an external electrodermal signal detection line to collect the electrodermal signal of the shoulder and the back of the human; in which, the charging and detection interface 14 is USB Type-C interface; when this interface is connected with the charging line, the device body 1 is in a charging state, and when this interface is connected with the electrodermal signal detection line, the device body 1 can collect the electrodermal signal of the human.

In the above embodiments, after pressing the switch button 13, the state index 12 is flashing, and the bluetooth module is in a wait for connection state. The user fixes the earlobe clip 11 of the device body 1 at the earlobe, and establishes a connection between the device body 1 and the bluetooth module by using the intelligent terminal 2. The physiological index collection instruction is configured and sent by the intelligent terminal 2. The collecting and processing assembly 101 at the device body 1 can collect the corresponding physiological index signal according to the physiological index collection instruction. After collecting and processing, the detected physiological index data is transmitted to the intelligent terminal 2 by using the bluetooth module, so as to facilitate the user to view.

The embodiments in present application further discloses a physiological index monitoring method based on the collecting and processing assembly 101.

The physiological index monitoring method is applied to the above wearable multi-index integrated physiological intelligent sensor system. The physiological index monitoring method includes, receiving the physiological index collection instruction sent by the intelligent terminal 2, and collecting the corresponding physiological index signal in response to the physiological index collection instruction; in which, the physiological index signal includes electrodermal signal, heart rate signal and blood oxygen signal;

analyzing and processing the physiological index signal to obtain the corresponding physiological index data, and sending the physiological index data to the intelligent terminal 2 for display.

In the above embodiment, when monitoring the physiological indices, the user send the physiological index collection instruction by using the intelligent terminal 2, and the collecting and processing assembly 101 at the device body 1 collects the corresponding physiological index signal in response to the physiological index collection instruction, and analyses and processes the physiological index signal to obtain the physiological index data, and sends the physiological index data to the intelligent terminal 2. The user can view their own physiological index data by the intelligent terminal 2. Compared with the common physiological index monitoring device, the device provided in the present application is small, portable and integrates multiple physiological indices. The physiological indices of the human can be monitored by wearing the device at the human ear, which is convenient for the user to obtain their own multiple physiological indices information in real time, so as to realize a real-time monitoring of a physical health and improve the user experience.

As the further embodiment of the physiological index monitoring method, the physiological index monitoring method further includes, upon the collecting of the corresponding physiological index signal, determining whether the blood oxygen signal or heart rate signal has been successfully obtained; if the blood oxygen signal or the heart rate signal has been successfully obtained, outputting the wearing state normal signal; if the blood oxygen signal or the heart rate signal has failed to be obtained, stopping collecting the physiological index signal and outputting the wearing state abnormal signal.

In the above embodiments, during monitoring, if the blood oxygen signal or the heart rate signal can be obtained normally, it can be determined that the wearing state is normal; if the blood oxygen signal or the heart rate signal cannot be obtained, it indicates that the blood oxygen signal or the heart rate signal cannot be collected, thus it can be determined that the earlobe clip 11 is not clamped well or has been removed, that is, the wearing state is abnormal. Thus, it is convenient to know the wearing state of the device body 1 in real time.

As the further embodiment of the physiological index monitoring method, the physiological index monitoring method further includes, collecting the acceleration value generated by the human during the motion, and determining whether the acceleration value is higher than the preset threshold; if yes, turning on the green light emitter 3, and marking the time period when the acceleration value is higher than the preset threshold as the motion period; if no, turning off the green light emitter 3.

In the above embodiments, when the human is in motion, the collection of the blood oxygen signal and/or the heart rate signal can be disturbed by the ambient light. Thus, when the acceleration value collected by the acceleration sensor reaches the preset threshold, the green light emitter 3 is turned on to emit a green light to inhibit the ambient light around the earlobe clip 11, so that the accuracy when collecting the blood oxygen signal and/or the heart rate signal is improved; when the acceleration value is not higher than the preset threshold, the green light emitter 3 will not be turned on.

In the several embodiments provided in the present application, it should be understood that, the provided method and the system can be realized in other ways. For example, the embodiments of the system described above only is exemplary; for example, the division of a module only is a logical function division, and in actual implementation, it can be another division method, for example, multiple units or assemblies can be combined or integrated into another system, or some characteristics can be ignored or not be implemented. In addition, the mutual connection or communication connection shown or discussed can be indirect coupling or communication connection by some interfaces, devices or units, and also can be electrical, mechanical or other forms of connection.

The embodiments of the present application further disclose a computer readable storage medium.

The computer readable storage medium stores a computer program, which can be loaded by the processor and execute any one of the above physiological index monitoring methods.

In which, the computer readable storage medium can be any tangible medium containing or storing a program, which can be used by or in combination with an instruction execution system, equipment or device. A program code contained in the computer readable medium can be transmitted by any suitable mediums, including but not limited to wireless, wire, optical cable, RF and so on, or any suitable combinations of the above.

It should be illustrated that, in the above embodiments, the description of each embodiment has its own emphasis. For the part not be described in detail in one embodiment, refer to the relevant description of other embodiments.

The above are the preferred embodiments of the present application, and the protection scope of the present application is not limited. Unless otherwise stated, any features disclosed in the specification (including the abstract and the drawings) can be replaced by other equivalent or similar alternative features. That is, unless otherwise stated, each feature only is one example of a series of equivalent or similar features.

What is claimed is:

1. A wearable multi-index integrated physiological intelligent sensor system, comprising: a device body and an intelligent terminal; wherein the device body is provided with a fixing piece comprising an earlobe clip and a collecting and processing assembly that is in wireless communication connection with the intelligent terminal, the earlobe clip is fixedly connected to the device body and configured for clamping an earlobe part of a human ear to fix the device body at the human ear; the collecting and processing assembly is configured to collect a corresponding physiological index signal in response to a physiological index collection instruction sent by the intelligent terminal, analyze and process the corresponding physiological index signal to obtain corresponding physiological index data, and send the corresponding physiological index data to the intelligent terminal; wherein, the corresponding physiological index signal comprises an electrodermal signal, a heart rate signal and a blood oxygen signal; and the intelligent terminal is configured to receive and display the corresponding physiological index data, wherein the collecting and processing assembly comprises an acceleration sensor and a processing module, the acceleration sensor is configured to collect an acceleration value generated during motion of a human and send the acceleration value to the processing module, the processing module is configured to determine whether the acceleration value is higher than a preset threshold, and mark a time period in which the acceleration value is higher than the preset threshold as a motion period, and the device body is further provided with a green light emitter disposed at an inner side of a clip body at one side of the earlobe clip, the green light emitter is connected with the processing module and configured to be turned on to emit a green light to inhibit an ambient light around the earlobe clip when the acceleration value is higher than the preset threshold and while collecting at least one of the blood oxygen signal or the heart rate signal.

2. The wearable multi-index integrated physiological intelligent sensor system according to claim 1, wherein, the collecting and processing assembly is further configured to, upon the collecting of the corresponding physiological index signal, determine whether the blood oxygen signal or the heart rate signal has been successfully obtained; when the blood oxygen signal or the heart rate signal has been successfully obtained, output a wearing state normal signal; when the blood oxygen signal or the heart rate signal has failed to be obtained, stop collecting of the corresponding physiological index signal and output a wearing state abnormal signal.

3. The wearable multi-index integrated physiological intelligent sensor system according to claim 1, wherein, the collecting and processing assembly comprises an electrodermal signal collection unit, an infrared light emitter, a red light emitter and a photoelectric sensor, the electrodermal signal collection unit is configured to collect an electrodermal signal of a shoulder and a back of a human body; the red light emitter and the infrared light emitter are provided at an inner side of the clip body at the one side of the earlobe clip, and the photoelectric sensor is provided at the inner side of the clip body at another side of the earlobe clip; the collection of the at least one of the heart rate signal or the blood oxygen signal is performed by the photoelectric sensor by receiving a light beam emitted by the infrared light emitter and the red light emitter and transmitted through the earlobe part.

4. A physiological index monitoring method, which is applied to the wearable multi-index integrated physiological intelligent sensor system according to claim 1, wherein, the physiological index monitoring method comprises:

receiving the physiological index collection instruction sent by the intelligent terminal, and collecting the corresponding physiological index signal in response to the physiological index collection instruction; wherein, the corresponding physiological index signal comprises the electrodermal signal, the heart rate signal and the blood oxygen signal;

analyzing and processing the corresponding physiological index signal to obtain the corresponding physiological index data, and sending the corresponding physiological index data to the intelligent terminal for display, and collecting the acceleration value generated by the human during the motion, and determining whether the acceleration value is higher than the preset threshold; when the acceleration value is higher than the preset threshold and while collecting the at least one of the blood oxygen signal or the heart rate signal, turning on the green light emitter so that the green light emitter emits the green light to inhibit the ambient light around the earlobe clip, and marking the time period in which the acceleration value is higher than the preset threshold as the motion period; and when the acceleration value is not higher than the preset threshold, turning off the green light emitter.

5. The physiological index monitoring method according to claim 4, wherein, the physiological index monitoring method further comprises:

upon the collecting of the corresponding physiological index signal, determining whether the blood oxygen signal or the heart rate signal has been successfully obtained; when the blood oxygen signal or the heart rate signal has been successfully obtained, outputting a wearing state normal signal; when the blood oxygen signal or the heart rate signal has failed to be obtained, stopping collecting of the corresponding physiological index signal and outputting a wearing state abnormal signal.

6. A computer readable storage medium with a computer program stored thereon, wherein the computer program is configured to be loaded by a processor to implement the physiological index monitoring method according to claim 4.

7. The wearable multi-index integrated physiological intelligent sensor system according to claim 3, wherein the earlobe clip comprises clip bodies disposed on both sides of the earlobe clip, the clip bodies being configured to completely cover the earlobe part of the human ear, the heart rate signal is collected by turning on the red light emitter separately to emit a red light, and the blood oxygen signal is collected by turning on the red light emitter and the infrared light emitter at a same time.

8. The wearable multi-index integrated physiological intelligent sensor system according to claim 3, wherein the electrodermal signal collection unit comprises two electrodermal signal collection buckles.

9. The wearable multi-index integrated physiological intelligent sensor system according to claim 8, wherein the device body is further provided with a charging and detection interface configured to charge the device body when connected with a charging line and collect the electrodermal signal of the shoulder and the back of the human body when connecting with the two electrodermal signal collection buckles through an external electrodermal signal detection line.

10. The wearable multi-index integrated physiological intelligent sensor system according to claim 2, wherein the device body is further provided with a state index configured to provide an on/off state of the device body and a wearing state of a user.

11. The wearable multi-index integrated physiological intelligent sensor system according to claim 10, wherein the state index is further configured to flash a second green light when it is detected that the wearing state is normal and flash a red light when it is detected that the wearing state is abnormal.

\* \* \* \* \*